March 1, 1955

A. A. SCHWARTZ, JR 2,703,389

TIME-DELAY NETWORK

Filed Nov. 17, 1953

United States Patent Office 2,703,389

Patented Mar. 1, 1955

2,703,389

TIME-DELAY NETWORK

Alfred A. Schwartz, Jr., New York, N. Y., assignor to Hazeltine Research, Inc., Chicago, Ill., a corporation of Illinois Application November 17, 1953, Serial No. 392,606

16 Claims. (Cl. 333—29)

*General*

Figure 1:
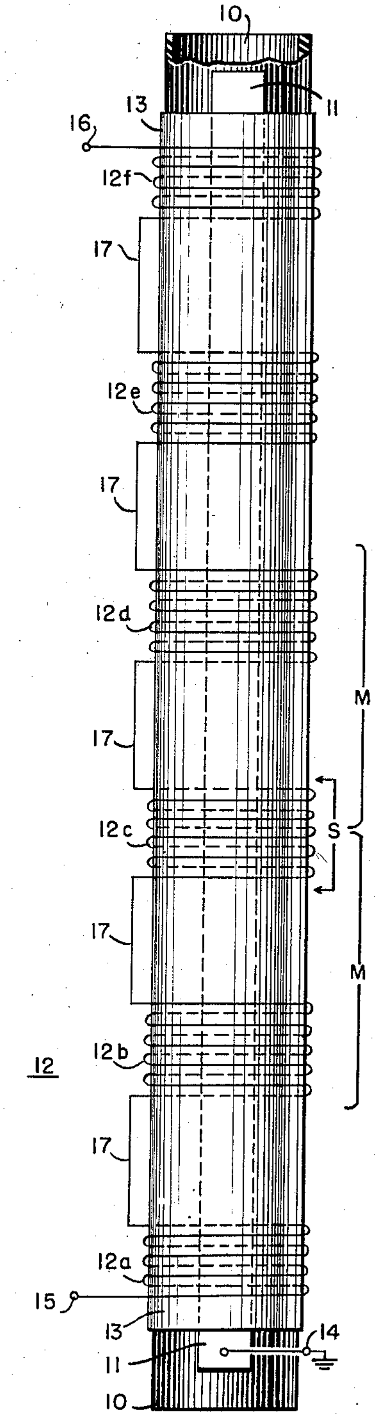

The present invention is directed to time-delay networks and, more particularly, to the unbalanced or three-terminal type of such networks for translating with substantially equal time delays signal components which may extend over a wide range of frequencies.

The three-terminal type of time-delay network is well known. Such a network is essentially an unbalanced circuit including a single distributed winding or coil insulated from but electrically coupled along its length to a conductive member, such as a conductive shield disposed or supported on a core structure, to establish distributed series inductance and distributed shunt capacitance in the network. An input terminal and an output terminal are provided at the opposite ends of the winding while a third or common terminal is connected to the conductive shield and usually takes the form of a ground connection. Such a network simulates a transmission line and has a time delay proportional to the geometric mean of its total effective series inductance and its total effective shunt capacitance. The physical characteristics of the windings such as the dimensions thereof, the number of turns per unit length, the dimensions of the conductive shield, and the type and thickness of the dielectric material between the winding and the conductive shield determine the total time delay of the network. The losses in the windings, the conductive shield, and the dielectric materials determine the attenuation and the pass-band characteristics of the network. Where long delays are to be realized with structures of practical physical dimensions, the winding has a large number of turns per unit length.

Many such time-delay networks translate the high-frequency components of an applied signal with a time delay which is less than that required to translate the low-frequency components thereof. Networks having this nonlinear frequency-translating characteristic are undesirable for certain applications such as in the video-frequency brightness channel of a color-television receiver wherein it is desired to effect the same time delay in the translation of the high-frequency brightness information as the lower frequency information passing through that channel.

It has been determined that the unequal time delays afforded by a time-delay network in the translation of high-frequency and low-frequency components of an applied signal are because adjacent turns of the winding of the network, while being magnetically linked, carry currents which become more and more out of phase with an increase in frequency. Consequently, the magnetic flux resulting from these currents also becomes more and more out of phase and the inductance per unit length of the winding decreases. Since the over-all time delay of the network is proportional to the square root of the total effective series inductance thereof, the time delay imparted to applied signal components decreases as the frequency thereof increases.

Various procedures have been employed to control the phase distortion produced by the change with frequency in the inductance of prior time-delay networks. In one procedure, the decrease in the total effective inductance has been compensated by a rise in effective capacitance which is achieved by the use of distributed bridge capacitances afforded by patches of conductive foil disposed along the winding of the network and insulated from each other, the winding, and ground. In another procedure, the winding of the time-delay network has been divided into a plurality of winding sections which help to reduce the phase distortion by reducing the number of out-of-phase flux linkages. The first expedient mentioned above of supplying distributed capacitance results in a time-delay network having a core and foil structure which is rather complex and, hence, the network is more costly than is desired for some applications. The second expedient of sectionalizing the winding not only causes the physical length of the network to be rather long because of the spacing between winding sections but also may introduce a cutoff frequency which may be lower than is desired for certain applications.

It is an object of the invention, therefore, to provide a new and improved time-delay network for translating with substantially equal time delays signal components which may extend over a wide range of frequencies and which avoids one or more of the above-mentioned disadvantages and limitations of prior such networks.

It is another object of the invention to provide a new and improved time-delay network for translating signal components within a predetermined range of frequencies and which is relatively simple in construction and inexpensive to manufacture.

In accordance with a particular form of the invention, a time-delay network for translating with substantially equal time delays signal components which may extend over a wide range of frequencies comprises an elongated conductive member. The network also includes an elongated winding including a plurality of winding sections insulated from the conductive member but electrically coupled thereto along a major portion of the length of the winding sections for providing distributed capacitance which, taken with the inductance of the winding, determine the time delay of the network. Adjacent ones of the winding sections are wound in opposite senses so that a change with frequency in the mutual inductance between adjacent sections of the winding is in a sense tending to offset a change with frequency in the self-inductance of individual ones of the winding sections.

For a better understanding of the present invention, together with other and further objects thereof, reference is had to the following description taken in connection with the accompanying drawing, and its scope will be pointed out in the appended claims.

Figure 2:
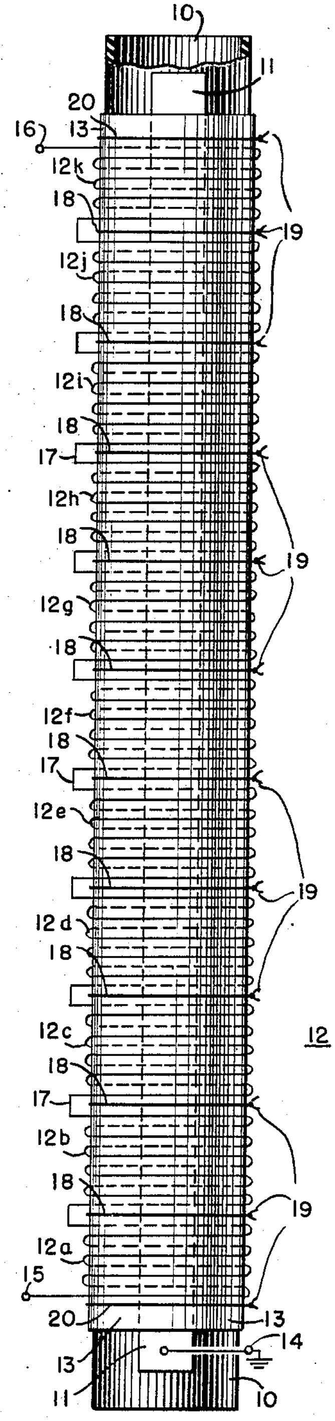

Referring to the drawing:

Fig. 1 is a schematic representation of a time-delay network in accordance with one form of the invention, and Fig. 2 is a similar representation of a modified form of time-delay network in accordance with the present invention.

*Description of Fig. 1 time-delay network*

Referring now more particularly to Fig. 1 of the drawing, the time-delay network there represented is an unbalanced or three-terminal network for translating with substantially equal time delays signal components which may extend over a wide range of frequencies. This network is in the form of a simulated transmission line and comprises an elongated supporting core 10 of suitable insulating material such as a phenolic condensation product formed into a rod or tube of any desired cross-sectional configuration. More specifically, the core 10 is a cylindrical tubular member having an elongated conductive member 11 in the form of a thin copper or other conductive ribbon suitably secured to the periphery of the core by means of cement or by adhesive tape. The width of the member 11 need not be great and may occupy but a small fraction of the periphery of the core such as one-quarter thereof. However, if desired the width of member 11 may occupy a major fraction of periphery of the core. For some applications the conductive member 11 may be a thin high-resistance metallized film or sheath of such material as silver or gold bonded to the core by a suitable plating, spraying, or printing operation. Ordinarily such a film does not form a closed ring around the core 10 and is longitudinally slotted to reduce eddy-current losses, and may have such conductivity that the eddy-current losses therein are approximately equal to the conduction current losses thereof at the mid-frequency of the range of the signal components translated by the time-delay network as described in detail and claimed in Patent 2,413,609, entitled "Time-Delay Network," and granted December 31, 1946 to Harold A. Wheeler. Alternatively, the structure comprising the core 10 and the conductive member may be an elongated solid structure of conductive material such as comminuted graphite as described in Patent 2,413,607, entitled "Time-Delay Network," and granted December 31, 1946 to Michael J. Di Toro.

The network also includes an elongated winding 12 including a plurality of winding sections 12*a*–12*f*, inclusive, wound around the core 10 and the conductive member 11 and insulated from the conductive member but electrically coupled thereto along the major portion of the length of the sections for providing distributed capacitance which taken with the inductance of the winding are effective to determine the time delay of the network. The winding 12 is insulated from the conductive member 11 by an insulating sheath 13 of suitable material such as polystyrene tape although this insulation may be omitted where the insulation of the winding 12 has sufficiently high dielectric properties. As represented in the drawing, adjacent ones of the winding sections, such as the sections 12*a* and 12*b*, are wound in opposite senses or directions so that the change with frequency in the mutual inductance between adjacent sections is in sense tending to offset the change with frequency in the self-inductance of individual ones of the sections, in a manner which will be explained more fully hereinafter.

The winding 12 may be a continuous single-layer winding having interconnections 17, 17 between individual sections thereof. The interconnections may be anchored to the insulating sheath 13 during the winding operation in a suitable manner as by cement or an adhesive tape. The winding 12 includes an input terminal 15 at one end of the time-delay network and an output terminal 16 at the opposite end thereof. The network further includes a common or grounded terminal 14 conductively connected to the conductive member 11 at one end thereof. If desired, a second grounded terminal may be employed at the opposite end of the network. The described time-delay network thus will be seen to constitute an unbalanced or three-terminal network.

It will be also appreciated that the representation in Fig. 1 of the drawing is of necessity somewhat diagrammatic. Actually, each winding section 12*a*–12*f*, inclusive, includes many turns, for example, 150 turns, rather than the 4 or 5 turns which have been represented for convenience of illustration. For some applications it may be desirable to reduce end effects by employing fewer turns for the end windings 12*a* and 12*f* of the time-delay network.

*Operation of time-delay network of Fig. 1*

Because of the inherent capacitance between the winding 12 and the conductive member 11 of the network, the winding is coupled along its length to the conductive member to provide in the delay network a distributed capacitance, namely the capacitance between the conductive member and the winding. This capacitance and the inductance of the winding 12 determine the time delay of the network since, in any such network, the total time delay is proportional to the geometric mean of its total inductance and total capacitance. The diameter and length of the core 10 beneath the winding 12, the size and type of the conductor utilized in fabricating winding 12, and the number and pitch of the winding convolutions are selected to afford such desired values of inductance and capacitance that the network produces a desired total time delay. In this connection, it will be appreciated that an increase in the length of the core and the winding associated therewith results in higher values of inductance and capacitance, while increasing the number of turns per unit length of the winding or the diameter of the core without changing the width of the conductive member 11 increases primarily only the inductance.

In considering the manner in which the time-delay network of the present invention avoids a decrease in the total effective inductance thereof with increasing frequency of the applied signal, it will be helpful to consider the inductance of a representative winding section such as the intermediate section 12*c*. Assuming for the moment that the network is a conventional time-delay network wherein the sections 12*b* and 12*d* are wound in the same sense or direction as the winding 12*c*, the inductance L of the latter may be expressed by the equation:

$$L=S_0-\Delta s+2(M_0-\Delta m) \qquad (1)$$

In the above expression, $S_0$ is the self-inductance of winding section 12*c* at a predetermined low frequency such as zero frequency. The term $\Delta s$ is the change in the self-inductance of winding section 12*c* occasioned by an increase in frequency from the predetermined or zero frequency. This change is in such a sense that the self-inductance at the higher frequency is less than the value $S_0$ appearing at zero frequency. The term $M_0$ is the mutual inductance at the predetermined low or zero frequency resulting from the flux of winding section 12*d* linking with section 12*c* and the flux of winding section 12*b* linking with section 12*c*. The term $\Delta m$ in the foregoing equation is the change experienced in the mutual inductance as a result of an increase in frequency of signal components from the zero frequency. This change is also in such a sense that the mutual inductance at the higher frequency is less than the value $M_0$ developed at zero frequency. From the foregoing equation and explanation of the terms thereof, it will be seen that the inductance L of the winding section 12*c* at the higher frequencies is less than its value at zero frequency. In general, this is also true with reference to the remaining winding sections and hence to the entire winding 12.

As previously stated, this change in inductance L occurs because of a redistribution of currents in the winding sections under consideration at the higher frequencies, which redistribution causes the magnetic flux resulting from these currents to be more and more out of phase.

For the time-delay network in accordance with the present invention and as represented in Fig. 1 wherein adjacent winding sections are wound in opposite directions, the inductance L of a winding section such as section 12*c* may be expressed by the equation:

$$L=S_0-\Delta s-2(M_0-\Delta m) \qquad (2)$$

wherein the symbols are the same as those employed in Equation 1 and have the same significance. It will be noted, however, that the mutual inductance expression is now subtracted from that of the self-inductance portion of the equation because the winding sections 12*c* and 12*d* are wound in opposite directions (creating a mutual inductance having a sense opposite to that of the self-inductance) and also because the winding sections 12*c* and 12*b* are also wound in opposite directions. Since both of the terms $S_0$ and $M_0$ are constants, the terms $S_0$ and $2M_0$ in Equation 2 may be expressed as a constant K. Substituting this constant in Equation 2, the latter may be rewritten as follows:

$$L=K-\Delta s+2\Delta m \qquad (3)$$

Thus, as the change in self-inductance $\Delta s$ is in one sense with an increase with frequency, the change in mutual inductance $\Delta m$ is in an opposite sense and tends to offset a change with frequency of the self-inductance in individual ones of the winding sections. By selecting the spacing between the various winding sections such as 12*b*, 12*c*, and 12*d*, a desired inductive coupling between the adjacent sections may be effected, which coupling controls the mutual inductance. The flux linkages of one winding produced by current in another winding may be controlled so that the change with frequency in the mutual inductance $\Delta m$ of a winding section as represented by the last term of Equation 3 tends to offset or may effectively cancel the change with frequency in the self-inductance $\Delta s$ of a winding section as represented by the next to the last term in Equation 3, whereby the inductance of a winding section may be expressed by the equation:

$$L=K \qquad (4)$$

where $K=S_0-2M_0$ as mentioned above.

The same considerations discussed above with reference to the winding sections 12*b*, 12*c*, and 12*d* also apply to the remaining winding sections. Accordingly, the winding of adjacent sections of the winding sections 12*a*–12*f* in opposite directions taken in conjunction with the selected spacings between those sections are effective to produce a change with frequency in the mutual inductance between those adjacent sections in a sense to maintain the effective inductivity or total effective inductance of the time-delay network substantially constant. Consequently, a delay network of this type tends to translate with substantially equal time delays signal components which extend over a relatively wide range of frequencies.

*Description and explanation of operation of time-delay network of Fig. 2*

Referring now to Fig. 2 of the drawing, there is represented a time-delay network which is very similar to that of Fig. 1. In the Fig. 2 embodiment of the invention, the spacing between the winding sections may be much less since the mutual inductance of the winding is not controlled by means of a relatively wide spacing between winding sections. For most applications, this spacing may be less than the axial length of a winding section. The time-delay network of Fig. 2 differs primarily from that of Fig. 1 in that it includes between individual winding sections individual shields which reduce the magnetic coupling between those sections. These magnetic shields may be in the form of a plurality of short-circuited turns or closed loops 18 of conductive material. These loops may be conductive bands bonded to the core or may be loops of copper wire which encircle the core and conductive member as represented in Fig. 2. These closed loops preferably are of a wire of a diameter greater than that of the wire forming winding 12 to facilitate construction and may be made of a short length of wire suitably bent around the coil from and twisted at the free ends 19 thereof as represented in the drawing. The free ends are ordinarily soldered to form a good mechanical and electrical joint. A closed loop of wire 20 similar to loop 18 may be employed at each end of a time-delay network for reducing the inductance at the ends of the network. As in the Fig. 1 embodiment of the invention, the end winding sections 12*a* and 12*k* may have fewer turns therein to help compensate for end effects.

The operation of the time-delay network of Fig. 2 is much the same as that of the network of Fig. 1. At low frequencies the flux developed by current flowing in adjacent winding sections such as 12*b* and 12*c* are 180° out of phase and cancel beneath the closed loops 18, 18 so that no flux flows therethrough. Thus the loops have no significant effect on the operation of the network at such frequencies. At the higher frequencies when the mutual flux resulting from the currents flowing in the winding sections become more and more out of phase and undesirably tend to increase the inductance and in turn the time delay of the network to a greater degree than required, the closed loops serve as magnetic shields. Any flux from a winding section such as section 12*c* which would link the loop 18 between winding sections 12*c* and 12*b* will produce a current in that loop which will flow in a direction to produce a counteracting flux so that the net flux through the loop is substantially zero. Any flux linking the two winding sections 12*b* and 12*c* traverses a longer high-reluctance path around the wire loop 18. Consequently the mutual inductance of winding sections 12*b* and 12*c* is small. Likewise the mutual inductance of the winding 12 is small and the change with frequency of the mutual inductance of winding 12 is also small. Since, as indicated by Equation 3, twice the value of the change of the mutual inductance $\Delta m$ is employed to offset or cancel the change with frequency in the self-inductance of the time-delay network, the change $\Delta m$ is kept by the loops 18, 18 from being so large that it effects an overcompensation. Thus the winding sections of the time-delay network of Fig. 2 may be placed in closer physical relationship to each other than those of the Fig. 1 network. As a result the physical length of a network of the type represented in Fig. 2 may be smaller than the network of Fig. 1.

One embodiment of the Fig. 2 time-delay network found to have utility included:

| | |
|---|---|
| Core **10** | |
| Diameter | 9/16 inch tubing. |
| Length | 9½ inches. |
| Composition | Bakelite. |
| Conductive member **11** | Copper foil 2 mils thick, ½ inch wide, 9½ inches long. |
| Insulating layer **13** | 2 layer wrap of 1.5 mil polyethylene tape. |
| Winding **12** | 12 sections spaced ⅛" apart, end sections having 150 turns of No. 40 Formex wire, intermediate sections having 155 turns thereof. |
| Wire loops **18** | 1 turn No. 26 tinned copper wire. |
| Characteristic impedance | 1750 ohms. |
| Time delay | 1.2 microseconds. |
| Nominal frequency range | 0–3.5 megacycles. |

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A time-delay network for translating with substantially equal time delays signal components which may extend over a wide range of frequencies comprising: an elongated conductive member; and an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections.

2. A time-delay network for translating with substantially equal time delays signal components which may extend over a wide range of frequencies comprising: an elongated conductive member; and an elongated single layer winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections.

3. A time-delay network for translating with substantially equal time delays signal components which may extend over a wide range of frequencies comprising: an elongated conductive member; and an elongated winding including a plurality of substantially identical winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections.

4. A time-delay network for translating with substantially equal time delays signal components which may extend over a wide range of frequencies comprising: an elongated conductive member; and an elongated winding including a plurality of uniformly spaced winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections.

5. A time-delay network for translating with substantially equal time delays signal components which may extend over a wide range of frequencies comprising: an elongated conductive member; and an elongated winding including a plurality of substantially identical and uniformly spaced winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections.

6. A time-delay network for translating with substantially equal time delays signal components which may extend over a wide range of frequencies comprising: an elongated core of insulating material; an elongated conductive ribbon on said core; and an elongated winding disposed over said ribbon and said core and including a plurality of winding sections insulated from said ribbon but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections.

7. A time-delay network for translating with substantially equal time delays signal components which may extend over a wide range of frequencies comprising: an elongated conductive member; and an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; said conductive member having such conductivity that the eddy-current losses therein are approximately equal to the conduction-current losses thereof at the mid-frequency of said range.

8. A time-delay network for translating with substantially equal time delays signal components which may extend over a wide range of frequencies comprising: an elongated conductive member; and an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite directions so that a change with frequency in the mutual inductance between said adjacent sections is in a sense tending to maintain the effective inductivity of said network substantially constant.

9. A time-delay network for translating with substantially equal time delays signal components which may extend over a wide range of frequencies comprising: an elongated conductive member; an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; and a conductive shield positioned between each of said sections for reducing mutual inductive coupling therebetween.

10. A time-delay network for translating with substantially equal time delays signal components which may extend over a wide range of frequencies comprising: an elongated conductive member; an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; and a plurality of short-circuited turns of conductive material positioned between each of said sections for reducing mutual inductive coupling therebetween.

11. A time-delay network for translating with substantially equal time delays signal components which may extend over a wide range of frequencies comprising: an elongated conductive member; an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; and a plurality of closed loops of wire positioned between each of said sections for reducing mutual inductive coupling therebetween.

12. A time-delay network for translating with substantially equal time delays signal components which may extend over a wide range of frequencies comprising: an elongated core of insulating material; an elongated conductive member supported by said core; an elongated winding disposed about said core and said member and including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; and a plurality of shields of conductive material encircling said core and member and positioned between each of said sections for reducing mutual inductive coupling therebetween.

13. A time-delay network for translating with substantially equal time delays signal components which may extend over a wide range of frequencies comprising: an elongated hollow core of insulating material; an elongated conductive ribbon mounted in concentric relationship on said core; an elongated winding disposed about said core and said ribbon and including a plurality of winding sections insulated from said ribbon but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; and a plurality of shields of conductive material encircling said core and said ribbon and positioned between each of said sections for reducing mutual inductive coupling therebetween.

14. A time-delay network for translating with substantially equal time delays signal components which may extend over a wide range of frequencies comprising: an elongated conductive member; an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections; a plurality of closed loops of wire positioned between each of said sections for reducing mutual inductive coupling therebetween; and a closed loop of wire positioned at each end of said conductive member adjacent each terminal end of the first and last ones of said winding sections.

15. A time-delay network for translating with substantially equal time delays signal components which may extend over a wide range of frequencies comprising: an elongated conductive member; an elongated winding including a plurality of winding sections insulated from said member but electrically coupled thereto along a major portion of the length of said sections for providing distributed capacitance which taken with the inductance of said winding determine the time delay of said network, adjacent ones of said sections being wound in opposite senses so that a change with frequency in the mutual inductance between said adjacent sections is in a sense tending to offset a change with frequency in the self-inductance of individual ones of said sections, and the two of said sections at opposite ends of said member having fewer turns than the intermediate ones of said sections to reduce end effects; and a conductive shield positioned between each of said sections for reducing mutual inductive coupling therebetween.

16. A time-delay network for translating with substantially equal time delays signal components which may extend over a wide range of frequencies comprising: an elongated conductive member; an elongated winding including a plurality of spaced winding sections insulated from said member but electrically coupled thereto along a major portion of the length of said sections for providing distributed capacitance which taken with the inductance of said winding determine the time delay of said network, the spacing between each of said sections being less than the length of each of said sections and adjacent ones of said sections being wound in opposite senses so that a change with frequency in the mutual inductance between said adjacent sections is in a sense tending to offset a change with frequency in the self-inductance of individual ones of said sections; and a conductive shield positioned between each of said sections for reducing mutual inductive coupling therebetween.

References Cited in the file of this patent

UNITED STATES PATENTS

| | | |
|---|---|---|
| 1,666,518 | Vreeland | Apr. 17, 1928 |
| 2,226,728 | Lalande et al. | Dec. 31, 1940 |
| 2,416,297 | Finch et al. | Feb. 25, 1947 |